United States Patent [19]

Takasu et al.

[11] Patent Number: 5,062,069

[45] Date of Patent: Oct. 29, 1991

[54] ID.ROM EMULATOR FOR MCA WIRELESS APPARATUS

[75] Inventors: Yasuo Takasu; Toshiharu Sakai; Seiichi Shindo; Takumi Kanazawa, all of Kanagawa, Japan

[73] Assignee: U.S. Philips Corp., New York, N.Y.

[21] Appl. No.: 407,376

[22] Filed: Sep. 14, 1989

[30] Foreign Application Priority Data

Sep. 14, 1988 [JP] Japan ................. 63-228440

[51] Int. Cl.⁵ ............... G06F 15/46; G05B 23/00
[52] U.S. Cl. ..................... 364/580; 324/73.1; 364/481; 364/551.01; 371/15.1
[58] Field of Search ............ 324/73.1, 600, 602; 364/580, 579, 578, 550, 551.01, 514, 480, 481; 371/15.1, 16.2, 20.1, 20.4

[56] References Cited

U.S. PATENT DOCUMENTS

| | | | |
|---|---|---|---|
| 4,354,268 | 10/1982 | Michel et al. | 371/15.1 |
| 4,622,647 | 11/1986 | Sagnard et al. | 371/16.2 |
| 4,633,417 | 12/1986 | Wilburn et al. | 364/550 |
| 4,656,632 | 4/1987 | Jackson | 364/580 |
| 4,718,064 | 1/1988 | Edwards et al. | 371/16.2 |
| 4,788,683 | 11/1988 | Hester et al. | 371/16.2 |
| 4,796,258 | 1/1989 | Boyce et al. | 371/16.2 |
| 4,868,822 | 9/1989 | Scott et al. | 371/16.2 |
| 4,928,246 | 5/1990 | Crawley et al. | 364/550 |

OTHER PUBLICATIONS

System Design; May 15, 1987; "Board Testers Mimic CPU for Improved Results"; Walsh, pp. 81–84.

Primary Examiner—Kevin J. Teska
Attorney, Agent, or Firm—Jack D. Slobod

[57] ABSTRACT

Test equipment for a Multi Channel Access (MCA) wireless apparatus includes a Read/Write memory section which operationally replaces an ID.ROM of the apparatus for the purpose of the testing. A personal computer writes area, channel, system, tone group and user code data into the memory section which is read by the operating section in order to configure its channel setting. A measuring device receives code data for a channel setting at which operation is to be checked, sends a corresponding channel designating signal to the wireless apparatus, receives a response signal from the wireless, and forms and sends to the personal computer a result signal indicative of whether the response signal is accepted or rejected. The personal computer operates to send the code data to the measuring device under program control in response to keyboard operation by the user.

4 Claims, 2 Drawing Sheets

ID.ROM EMULATOR FOR MCA WIRELESS APPARATUS

BACKGROUND OF THE INVENTION

1. Field of the Invention

The present invention relates to an MCA test equipment for an MCA (Multi Channel Access) wireless apparatus, which test equipment automatically evaluates and judges the correct operation of the MCA wireless apparatus by sending thereto and receiving therefrom check signals by the operation of a keyboard of a personal computer, wherein the change of the ROM incorporated in the MCA wireless apparatus is not necessary when the functions of the MCA wireless apparatus is checked.

2. Description of the Related Art

When of checking the correct operation of an MCA wireless apparatus, i.e., whether the apparatus correctly reads the contents of its ROM and transmits or receives radio waves of the frequencies complying with the written indications, it is necessary to check it with respect to each of the combinations of an area code, a channel code, a system code, a tone code, a group code and a user code which have been written in the ID.-ROM as data.

In practice, there has been employed such a checking method that the operating condition of an MCA wireless apparatus is checked with an MCA tester connected thereto wherein channel setting tools are inserted one by one to the apparatus in place of its ROM.

According to the above method, it has been difficult to automate the evaluation since the ROM to be inserted in the operating transceiver section should be manually replaced for each check item. Furthermore, since a great number of ROMs written with various data are necessary, it has been troublesome to control and maintain these ROMs. Also, when the evaluation should be made with specific data, it has wasted a lot of time to search for that specific ROM.

At present, the total number of bits of the codes is 22, so that the number of combinations of the code numbers is $2^{22}$. Therefore, it is necessary to provide a great number of ID.ROMs whose number will be the quotient of $2^{22}$ divided by the memory capacity of a ROM. For this reason, it is the present practice to substitute channel setting tools for the ID.ROMs for performing the entire test.

According to the method, in which the above-described channel setting tools are used, it can be ascertained by an MCA measuring device that the wireless apparatus correctly performs its transmission and reception operation in accordance with the area code (1), system code (2), user code (3), tone code (4) and channel code (5) complying with the set channel. However, the checking method with the channel setting tools is only effective as a simplified method, and the conditions thereof are different from those in the market in which the MCA wireless apparatus will be actually used.

Furthermore, when checking items which are randomly selected with respect to each of the area code, channel code, system code, tone code, group code and user code have to be changed, it is necessary to program the new checking items in the ROM, which leads to an inevitable decrease of work efficiency.

SUMMARY OF THE INVENITON

In order to solve the above-described problems, according to the present invention, a measure for, making the checking procedure more automatic was developed wherein the operating portion of an MCA wireless apparatus is connected to a personal computer.

More, specifically, the MCA wireless apparatus, which is the actual operating portion, is connected to an MCA measuring device having performance-evaluating functions and to a memory section for introducing performance-evaluating signals. A personal computer is provided between the MCA measuring device and the memory section, the personal computer being capable of evaluating response signals from the MCA measuring device and introducing desired checking items into the memory section to thereby store them. The relevant checking signal is then sent to the MCA wireless apparatus of which response signal is analyzed by the MCA measuring device which have received the same checking signal from the personal computer. Then, the personal computer automatically evaluates the results to thereby evaluate the correct operation of the actual operating portion.

According to the above-described method, analysis as to the correct operation of an MCA wireless apparatus, which has conventionally been made through a complicated hand-work of changing a number of ROM cards for each checking item, can be made automatically and at a high work efficiency by changing the checking items by the operation of a keyboard or by programs.

It has also become possible to test the actual apparatus in a condition very similar to the actual operating condition by providing each of the MCA measuring device and the MCA wireless apparatus with an antenna to transmit radio waves from the measuring device to the MCA wireless apparatus so that a matching to the signal from the memory is made.

Furthermore, it has become possible to sequentially carry out function checks, in an auto-scanning fashion until a predetermined number of samples are completed, by providing the check result (acceptance/ rejection) signal ultimately received by the personal computer after passing through around the checking circuit elements with a function of sending out the next check signal.

DETAILED DESCRIPTION OF THE PREFERRED EMBODIMENTS

First embodiment

Figure 1:
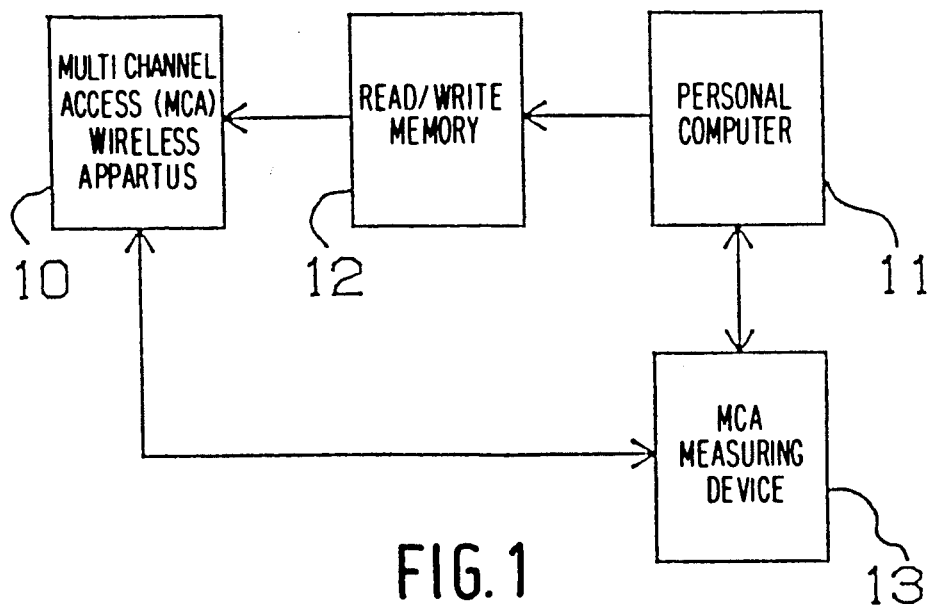
FIG. 1 is a block diagram of an MCA test equipment for an MCA wireless apparatus according to the invention.

FIG. 1 shows the structure of an MCA test equipment for an MCA wireless apparatus according to the present invention.

As shown, an ID.ROM section of the wireless apparatus 10 is replaced with a Read/Write memory section 12 of a personal computer 11. Respective code numbers of desired area code, system code, tone code, user code and channel code are stored in this memory section 12 by personal computer 11 in response to an operation of a keyboard or an activation of programs.

At the same time, the respective code number data designated by the operation of the keyboard are transferred from the personal computer to a measuring device 13.

Figure 4:
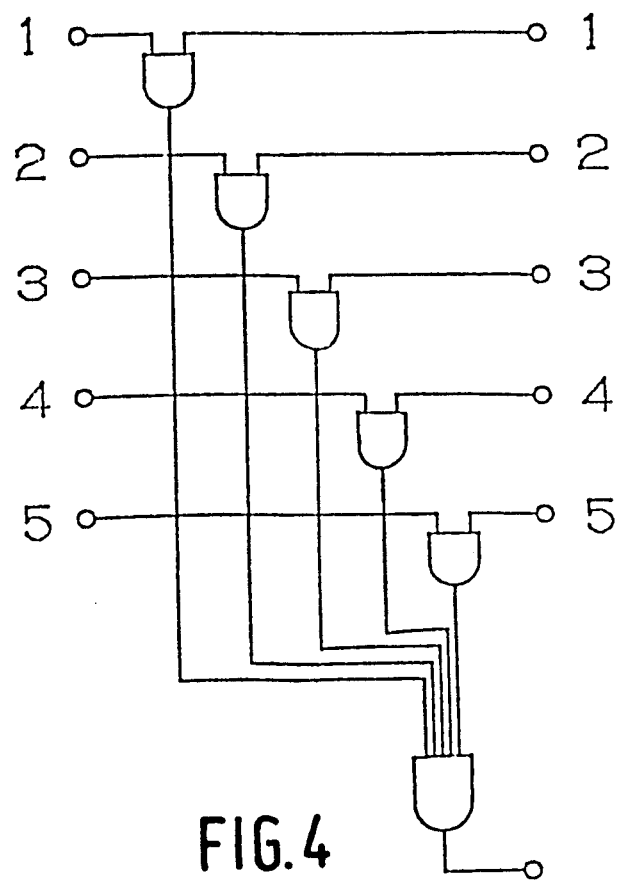
FIG. 4 is a diagrammatic illustration showing the checking function of an MCA test equipment for an MCA wireless apparatus according to the invention.

Based on the transferred data, a channel designating signal is sent from the measuring device 13 to wireless apparatus 10, and a check signal is sent from the personal computer to the memory section 12 to store the code number data at which operation of wireless apparatus 10 is to be checked. The code number data stored in the memory section 12 is then read by the wireless apparatus 10 whereby checking of the wireless apparatus 10 is commenced. (Refer to FIG. 4). Reference numerals 1, 2, 3, . . . represent an area code, a system code, a tone code, a user code and outputs to the personal computer a check result signal a channel code, respectively.

A response signal from the wireless apparatus 10 is sent to the measuring device which analyzes this signal, and based on which the personal computer evaluates whether the operation of the wireless apparatus was correct or not.

The above checking operation can be made for each channel with any desired data. Since the measurement data can be altered, for example, by the manipulation of the keyboard, any number can be randomly selected from among all possible combinations and the measurement can be done automatically.

Second Embodiment

Figure 2:
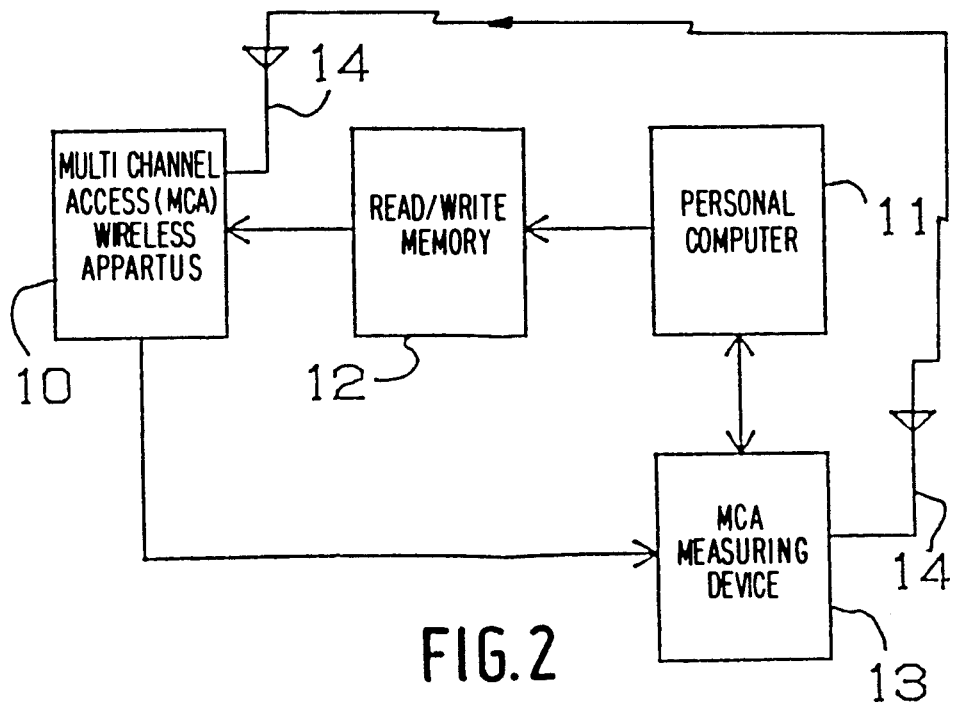
FIG. 2 is a block diagram of another MCA test equipment for an MCA wireless apparatus according to the invention wherein antennae are used.

FIG. 2 shows another example of the MCA wireless apparatus according to the present invention in which antennae 14 are provided respectively in the MCA measuring device 13 and the MCA wireless apparatus 10 as constituent elements of this invention.

The MCA measuring device 13 and the MCA wireless apparatus 10 are brought into a communication state, whereby the timing control function for operation-starting acknowledgement and receiving acknowledgement are activated in accordance with the matching operation in the MCA wireless apparatus 10.

More specifically, the functional equivalent to the wireless station in the actual operating state is implemented by the MCA measuring device 13, and the channel designating signal is sent through the radio wave transmitted between the antennae 14, so that the MCA wireless apparatus 10 can be checked in conditions equivalent to the actual testing conditions.

Third Embodiment

Figure 3:
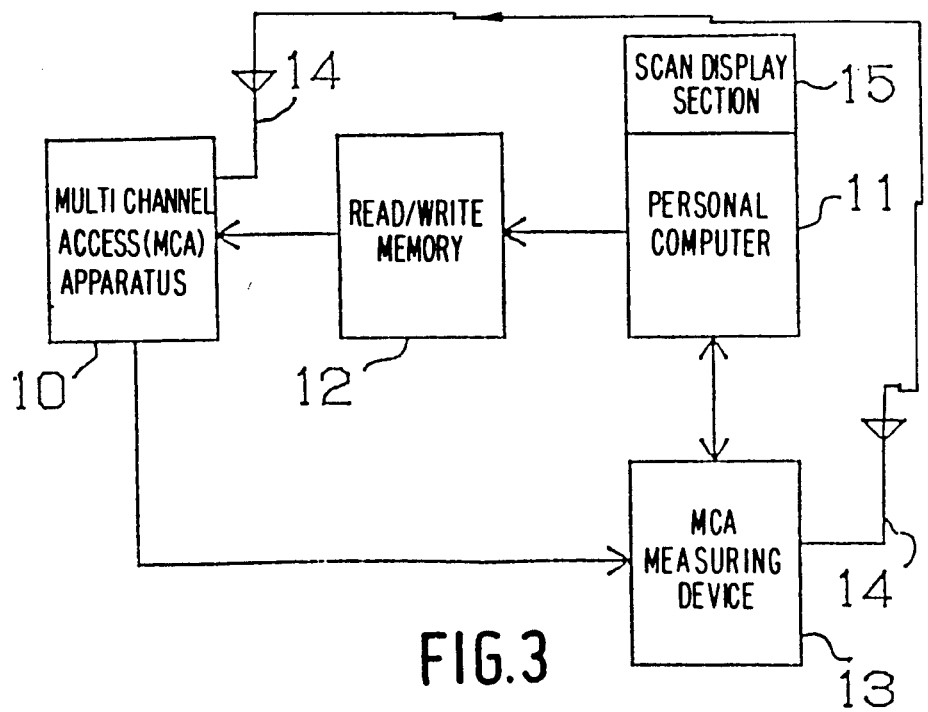
FIG. 3 is a block diagram of a further MCA test equipment for an MCA wireless apparatus according to the invention wherein the personal computer section is provided with a scan display section.

FIG. 3 shows a further example of the MCA test equipment for an MCA wireless apparatus according to the present invention in which the personal computer 11 is provided with a scan display section 15.

The check results, which are ultimately sent to the personal computer after passing through around the checking circuit elements of this invention, are visually displayed on the scan display section 15 so that the results are visually recognized by the operator. Also, the visual display of the check result (acceptance/rejection) signal is rendered a signal for transmitting the predetermined next check number to the memory section 12 and the measuring device 13 so that the function checking is sequentially carried out in an auto-scanning fashion until a predetermined number of samples are completed.

According to the above method, the acceptance/rejection results of the check numbers up to the number of samples, of which checks have been completed, are displayed on the scan display section 15 with the programmed symbols. By printing out the results, it becomes possible to preserve the test results and also it will become easy to cope with faulty products.

The MCA test equipment for an MCA wireless apparatus according to the present invention makes it possible to automatize the evaluation process which has conventionally been performed by manually changing the ROMs.

Also, it may become possible to omit the control and maintenance of ROMs, time required to search for desired ROMs and operation needed to write checking items into RAMs. The costs for rewriting ROMs to alter their contents may not be necessary any more.

Furthermore, since the contents of the memory section can be altered, by the employment of the MCA test equipment according to the invention, it has become possible to randomly evaluate the operation of MCA wireless apparatuses by selecting any desired channel by altering the data through the operation of the keyboard or the setting by the programs.

It has also become possible to test an MCA wireless apparatus in conditions similar to the actual conditions by providing the apparatus and the MCA measuring device with antennae.

Conventionally, each time one checking procedure is completed, it has been necessary to prepare for the next checking which has required complicated arrangements. However, by the employment of the auto-scanning, it has become possible to carry out such checking sequentially and to omit the above arrangements.

The MCA test equipment for an MCA wireless apparatus according to the invention uses IC memories in place of the ID.ROM. It is therefore possible to quickly rewrite the ROMs whereby the costs and time required by the entire checking process can be reduced.

We claim:

1. System for testing an operating section of a Multi Channel Access (MCA) wireless apparatus by checking its operation at channel settings selected from a relatively large set of different channel settings, said MCA wireless apparatus normally comprising said operating section and a replaceable ID.ROM section, for storing code data readable by said operating section, said code data being for said operating section to configure itself for operation at any channel setting in a predetermined relatively small set of different channel settings, said system comprising:

a Read/Write memory section connected to said operating section in a manner to be read by said operating section instead of said operating section reading said ID.ROM section;

an MCA measuring device for, in response to receipt of a first signal indicative of a channel setting at which the operation of the operating section is to be checked, sending a second signal to said operating section indicative of said channel setting, receiving a response signal from said operating section, and for forming a result signal indicative of whether said response signal is at said channel setting;

a computer connected to said MCA measuring device and to said memory section, said computer comprising means for forming and sending said first signal to said MCA measuring device corresponding to one or more channel settings selected from said relatively large set, for receiving said result signal from said MCA measuring device and for writing entries into said memory section corresponding to channel settings at which operation of said operating section is to be checked.

2. The system according to claim 1, wherein said operating section of said MCA wireless apparatus and said MCA measuring device are provided with radio transmitter means and radio receiver means, respectively, for sending said second signal by a radio wave from said measuring device to said operating section of said wireless apparatus.

3. The system according to claim 2, wherein the first signal is indicative of a group containing a predetermined number of channel settings at which the operation of said operating section is to be successively checked by said MCA measuring device and the result signal is indicative of the results of said successive checking, and wherein said MCA measuring device comprises means for sending a sequence of said second signals to said operating section, each indicative of a different channel setting in said group, in response to receipt of said first signal from said computer, for receiving a response signal from said operating section in response to each of said second signals, and for forming and sending said result signal to said computer after said predetermined number of checks have been completed.

4. The system according to claim 1, wherein the first signal is indicative of a group containing a predetermined number of channel settings at which the operation of said operating section is to be successively checked by said MCA measuring device and the result signal is indicative of the results of said successive checking, and wherein said MCA measuring device comprises means for sending a sequence of said second signals to said operating section, each indicative of a different channel setting in said group, in response to receipt of said first signal from said computer, for receiving a response signal from said operating section in response to each of said second signals, and for forming and sending said result signal to said computer after said predetermined number of checks have been completed.

* * * * *